(12) United States Patent
Varadachari

(10) Patent No.: US 8,216,337 B2
(45) Date of Patent: Jul. 10, 2012

(54) PROCESS FOR THE MANUFACTURE OF BIO-RELEASE FERTILIZERS OF ZINC-IRON-MANGANESE, IRON-MANGANESE-COPPER AND ZINC-IRON MANGANESE-COPPER

(75) Inventor: Chandrika Varadachari, Calcutta (IN)

(73) Assignee: National Research Development Corp., New Delhi (IN)

( * ) Notice: Subject to any disclaimer, the term of this patent is extended or adjusted under 35 U.S.C. 154(b) by 558 days.

(21) Appl. No.: 11/922,710

(22) PCT Filed: Jun. 21, 2006

(86) PCT No.: PCT/IN2006/000210
§ 371 (c)(1),
(2), (4) Date: Nov. 20, 2009

(87) PCT Pub. No.: WO2006/137084
PCT Pub. Date: Dec. 28, 2006

(65) Prior Publication Data
US 2010/0206032 A1 Aug. 19, 2010

(30) Foreign Application Priority Data
Jun. 21, 2005 (IN) .............................. 531/KOL/2005

(51) Int. Cl.
*C05B 17/02* (2006.01)
(52) U.S. Cl. ............................................. 71/42; 71/48
(58) Field of Classification Search .................. 71/42, 48
See application file for complete search history.

(56) References Cited

U.S. PATENT DOCUMENTS

| 2,713,536 A | 7/1955 | Driskell |
| 3,201,222 A * | 8/1965 | Wilson .............................. 71/45 |
| 3,574,591 A | 4/1971 | Lyons et al. |
| 2006/0196240 A1 | 9/2006 | Varadachari |

FOREIGN PATENT DOCUMENTS

| AT | 326160 T | 6/2006 |
| IN | 177205 A1 | 12/1996 |
| IN | 971DEL03 | 9/2006 |
| SU | 1270148 A1 | 11/1986 |
| WO | 2005014505 A1 | 2/2005 |

OTHER PUBLICATIONS

Ray et al. "Novel Slow-Releasing Micronutrient Fertilizers" Ind. Ing. Chem. Res., vol. 32, 1993, pp. 1218-1227.

* cited by examiner

Primary Examiner — Wayne Langel
(74) Attorney, Agent, or Firm — The Webb Law Firm

(57) ABSTRACT

A process for the preparation of water insoluble bio-release micronutrient fertilizers, containing iron and manganese with either zinc and/or copper, comprising (a) heating orthophosphoric acid at a temperature of 130° C.-150° C. with a mixture of (i) source of iron oxide, (ii) manganese dioxide or pyrolusite, and (iii) either or both compounds of zinc or copper selected from zinc ash or zinc oxide and cupric oxide, or cupric sulphate or cupric chloride and (iii) a basic compound such as oxide or carbonate of magnesium or calcium, to produce a multi-metallic polyphosphate; (b) neutralization of the polyphosphate with a basic compound followed by drying and pulverization to obtain a solid powdery material.

26 Claims, No Drawings

PROCESS FOR THE MANUFACTURE OF BIO-RELEASE FERTILIZERS OF ZINC-IRON-MANGANESE, IRON-MANGANESE-COPPER AND ZINC-IRON MANGANESE-COPPER

CROSS REFERENCE TO RELATED APPLICATIONS

This application claims the benefit of International Application No. PCT/IN2006/00210, filed Jun. 21, 2006, which claims priority to Indian Patent Application No. 531/KOL/2005, filed Jun. 21, 2005, the entire contents of each of the above are incorporated herein by reference.

FIELD OF INVENTION

This invention relates to a process for the manufacture of environment-friendly, bio-release types of slow-release fertilizer compounds containing the micronutrients, zinc-iron-manganese, iron-manganese-copper and zinc-iron-manganese-copper. These micronutrients have low water-solubility, but high plant-availability.

BACKGROUND OF INVENTION

Zinc, iron, manganese and copper fertilizers are widely used in many parts of the world particularly in soils of high pH, such as the black soils. They are also popularly used in horticultural and cash crops to improve yields and quality of produce. Deficiencies of zinc, iron, manganese and copper in crops are usually corrected by application of the salts zinc sulphate, ferrous sulphate, manganous sulphate and copper sulphate respectively. Chelated forms of these micronutrients, e.g., iron-EDTA, and manganese-EDTA compounds are also in use as liquid sprays (J. J. Mortvedt, P. M. Giordano & W. L. Lindsay, 1972, Micronutrients in Agriculture, Soil Science Society of America, Madison, Wis.).

All such micronutrient fertilizers are water soluble salts. They are, therefore, easily leached out of the root zone or chemically transformed to compounds, which are not assimilable by plants. Dosages for micronutrient fertilizers are, therefore, enormous compared to the actual requirement. Thus, dosages for Fe as ferrous sulphate and Mn as manganous sulphate range from 20-40 kg/ha (J. J. Mortvedt, P. M. Giordano & W. L. Lindsay, 1972, Micronutrients in Agriculture, Soil Science Society of America, Madison, Wis.). The actual uptake of these nutrients is in the region of 0.2-1.0 kg/ha. Such overdoses are required because micronutrients are leached out and chemically transformed. Therefore, economics of micronutrient use is not always favourable. This limits widespread usage and restricts improvement in yields. The problem is even more acute in well-drained soils receiving high rainfall, where water soluble micronutrient fertilizers may show little response. Additional long-term problems are ground water pollution due to fertilizer leaching and toxicity hazards due to overdoses.

An efficient way to provide macro and micronutrients is by using slow-release fertilizers. Polyphosphate has been a natural choice for formulation of insoluble micronutrient fertilizers because of low raw material costs. Micronutrient polyphosphate fertilizers may be categorized as (i) water soluble polyphosphate liquid sprays (Van Wazer, J. R., 1966, Phosphorus and its compounds, Interscience, New York), (ii) long chain metaphosphates of ammonium or potassium with incorporated micronutrients (Volkovich, S. L., 1972, Journal of Applied Chemistry (USSR) Vol 45, p 2479), (iii) phosphate glass frits, glass (Roberts, G. J., 1973, American Ceramic Society Bulletin, Vol 52, p 383) and (iv) partially polymerized, water insoluble linear polyphosphates Ray, S. K., Varadachari, C. & Ghosh, K., 1993, Industrial & Engineering Chemistry Research, Vol. 32, p 1218; Ray, S. K., Varadachari, C. & Ghosh, K., 1997, Journal of Agricultural & Food Chemistry, vol. 45, p 1447).

Of these, only the last three categories are slow release forms. Frits are prepared by fusing sodium, potassium or ammonium dihydrogen phosphates together with micronutrient salts at temperatures between 800.degree. and 1400.degree. C. and then rapidly quenching the melt to produce a glass (Roberts, G. J., 1973, American Ceramic Society Bulletin, Vol 52, p 383; Roberts, G. J., 1975, American Ceramic Society Bulletin, Vol 54, p 1069; Austrian Patent No 326160 of 1975; U.S. Pat. No. 3,574,591 of 1971; U.S. Pat. No. 2,713,536 of 1974). The major disadvantage of the phosphate glass frits is that the availability of the nutrients is by slow hydrolysis of the glass and is highly dependent on the soil (pH, moisture content, temperature, etc.) and on the crop (rate of growth, physiological factors, variety, etc.). Consequently, where nutrient release by hydrolysis does not match plant uptake, the fertilizer is not effective. Moreover, the high temperatures involved in the synthesis of frits together with the corrosive conditions make these materials fairly expensive and unsuitable for general use.

Another type of phosphate based water insoluble fertilizer is the metaphosphate. Metaphosphates of calcium and potassium together with micronutrients have been proposed (Volfkovich, S. I., 1972, Journal of Applied Chemistry (USSR) Vol 45, p 2479). A Russian patent (SU 1270148 of 1986) describes the production of mixed metaphosphates based fertilizers produced at 500.degree.-880.degree. C. Drawbacks in the use of metaphosphates as fertilizers are similar to those with the frits. Metaphosphates may be more insoluble and hydrolyse even slower, producing compounds with very poor nutrient availability. Metaphosphates of the heavy metals are extremely insoluble and of little use as fertilizers.

The last category (iv) of slow-release fertilizer, which belongs to the bio-release type, is probably the most promising of those developed so far. Here, the micronutrient ions are in a chemical form wherein they are insoluble but are, however, completely bio-available (plant available). The processes for producing such phosphate based zinc and copper fertilizers are described in two Indian patents (Nos 172800 of 1990 and 177205 of 1991). The chemistry of zinc and copper phosphate polymerisation and the chemical nature of these fertilizers have also been described (Ray, S. K., Varadachari, C. & Ghosh, K., 1993, Industrial & Engineering Chemistry Research. Vol. 32, p 1218; Ray, S. K., Varadachari, C. & Ghosh, K., 1997, Journal of Agricultural & Food Chemistry, vol. 45, p 1447). Bio-release fertilizers of iron-manganese have also been described (DST PCT Application No. PCT/IN/04/00234 and Indian patent application No 971/DEL/03). Another patent (Indian Patent No. 194747 of 1999) describes the processes for production of slow-release cationic fertilizers.

SUMMARY OF THE INVENTION

The process described here will be a step forward in the area of bio-release fertilizers because it will provide a new fertilizer containing a combination of the micronutrients zinc-iron-manganese, iron-manganese-copper and zinc-iron-manganese-copper. This is advantageous because (i) deficiencies of cationic micronutrients often occur together (e.g., in soils of high pH), (ii) even where deficiencies are not recorded, a complete nutrition can significantly improve crop performance, (iii) manganese and copper are not commonly used but can greatly improve disease resistance. Moreover, this process also presents a significant improvement over those described in the previous patents (Indian Patent Nos 194747 of 1999, 172800 of 1990 and 177205 of 1991) because (a) the process of this patent utilizes a single step reaction which is functionally easier than the two-stage reaction described in the earlier patents, (b) the process is workable at significantly lower temperatures of about 130.degree. C. thereby saving energy, compared to the earlier processes wherein at the first stage of reaction at least 150.degree. C. is required followed by hearing to at least 200.degree. C., and lastly (c) this process results in fertilizers having three or more micronutrients, whereas earlier processes result in products with a single or, at the most, two micronutrients.

An object of this invention is to propose a process for the manufacture of bio-release fertilizers containing the combined micronutrients zinc-iron-manganese, iron-manganese-copper or zinc-iron-manganese-copper. This will provide a combined nutrient source of zinc-iron-manganese, iron-manganese-copper or zinc-iron-manganese-copper in a single compound to compensate for the deficiencies of cationic micronutrients, viz., zinc, iron, manganese and copper generally present in soils and provide al the essential nutrients which are beneficial for crop growth.

Another objective of the present invention is to produce micronutrient fertilizers which will have low-water-solubility with all the advantages of slow-release fertilizers together with the added benefit of high nutrient availability.

A further object of this invention is to propose a process for the manufacture of bio-release fertilizers containing a bio-release source of ammonium, magnesium or calcium and phosphorus, which are all essential plant nutrients.

Still another object of this invention is to propose a process for the manufacture of bio-release fertilizers, wherein only a single heating stage is required and polymerisation temperatures are lower than in other processes described for water insoluble polyphosphates. Material handling and process control is also much simpler.

In accordance with one embodiment of the present invention, a process for the preparation of water insoluble bio-release micronutrient fertilizers, containing iron and manganese with either zinc and/or copper, is provided. The process includes the steps of heating orthophosphoric acid at a temperature of 130.degree. C.-150.degree. C. with a mixture of source of iron oxide, manganese dioxide or pyrolusite, either or both compounds of zinc or copper selected from zinc ash or zinc oxide and cupric oxide, or cupric sulphate or cupric chloride, and a basic compound such as oxide or carbonate of magnesium or calcium, to produce a multi-metallic polyphosphate. The process also includes the step of:

neutralizing the polyphosphate with a basic compound followed by drying and pulverisation to obtain a solid powdery material. Accordingly, this invention provides a process for production of water-insoluble, slow-releasing fertilizers of the bio-release type, containing zinc-iron-manganese polyphosphate, iron-manganese-copper polyphosphate and zinc-iron-manganese-copper polyphosphate together with one or more of the bases magnesium, calcium or ammonium, and where the polyphosphate is only partially polymerized to the extent that the compounds are highly soluble in citrate and DTPA solutions and thereby contain nutrients in plant available form.

DETAILED DESCRIPTION OF THE EMBODIMENTS

When compounds of iron [goethite, i.e., FeO(OH) or hematite, i.e., $Fe_2O_3$], manganese (pyrolusite or $MnO_2$), zinc (ZnO or zinc ash), a cupric salt (cupric oxide, cupric sulphate or Cupric chloride), and a basic compound (oxides or carbonates of magnesium, calcium) are heated with orthophosphoric acid, reaction occurs to form the dihydrogen phosphates of the metal ions, which subsequently polymerise to form polyphosphates.

Removal of free water from the system by heating facilitates the reactions. Vacuum facilitates the reaction by speeding up the removal of water. Polymerisation is allowed to continue till a product of optimum chain length is fumed as determined by its chemical properties. This polyphosphate product is a viscous, liquid. When neutralised with magnesia, lime or ammonia, a light coloured suspension is formed which can be dried and ground to a free flowing, non-hygroscopic product.

Zinc-Iron-Manganese Fertilizer

The starting materials are zinc ash or zinc oxide (which may contain up to 79% Zn), yellow oxide of iron, i.e., goethite, which may contain up to 62.8% Fe or red oxide of iron, i.e., hematite containing up to 69.9% Fe, pyrolusite or manganese dioxide which may contain up to 63% Mn, magnesia which may contain up to 60.3% Mg or magnesium carbonate which may contain up to 28.8% Mg and orthophosphoric acid containing not more than 60% $P_2O_5$.

The raw materials, viz., zinc ash, hematite and pyrolusite, are in such proportions that weight ratios of Zn ranging from Zn:Fe=20:1 to 1:20 may be used; proportions of Mn may be varied over the range Fe:Mn=1:0.1 to 1:10. Higher ratios of Mn may be used, without any difficulty in the process, if higher Mn content is desired in the product Optimum weight ratios would depend on soil and crop requirements and are generally as Zn:Fe:Mn=3:1:0.5 or 1:2:1.

Basic magnesium salt (MgO or $MgCO_3$) is added in any weight ratio ranging from Fe:Mg=1:0.01 to 1:10; the ratio of 1:0.125 is optimum. Lowering of ratios of Mg, causes the polyphosphate to become citrate insoluble; higher ratios of Mg cause an increase in the viscosity of the reaction slurry and also do not result in any particular improvement of the product or the process. The Mg compound may also be replaced with a Ca compound so that Fe:Ca weight ratios may vary from 1:16 to 1:0.016 Thus, dolomite ($CaCO_3MgCO_3$) or limestone ($CaCO_3$) may be used.

Phosphoric acid is to be added in quantities sufficient to convert all the Zn, Fe, Mn and Mg as well as impurities in the reaction mixture to the dihydrogen phosphates. In general, the impurities consume about 30% excess of P over that required by Zn+Fe+Mn+Mg; this amount of phosphoric acid must, therefore, be added in excess over the normal requirements for Zn, Fe, Mn and Mg. Thus, when Zn, Fe, Mn, and Mg are in the proportion 3, 1, 0.5, and 0.125, the weight ratios of P may vary from Zn:Fe:Mn:Mg:P=3:1:0.5:0.125:20 to 3:1:0.5:0.125:5, with an optimum would be around 3:1:0.5:0.125:9. Lower ratios of P than that required to form the dihydrogen phosphate of the cations, will result in incomplete reaction of the oxides and poor quality of product. Higher levels of P at any level results in excess acidity, which will require more base for neutralisation and confers no particular advantage. Phosphoric acid is taken in an acid-proof brick lined reactor vessel and zinc ash is added to it. The reactants are stirred and preferably heated to 70-100.degree. C. However, the reaction can also occur at room temperature, without heating, but will be very slow. Zinc ash dissolves and some hydrogen gas is evolved due to reaction of zinc metal (in the zinc ash) with acid. This step must be carried out prior to addition of iron and manganese oxides to avoid reduction of $Fe^{3+}$ and $Mn^{4+}$. However, if zinc oxide is used instead of zinc ash, prior reaction of zinc ash is not necessary. After about 15 min of heating when the evolution of $H_2$ ceases, hematite (or goethite), pyrolusite and roasted magnesite are added. Magnesite may be replaced by other bases like dolomite/calcite. However, magnesium compounds give the best products and are, therefore, preferred. Heating is continued at 130.degree. C. or higher up to a maximum of 150.degree. C. Application of vacuum at this stage facilitates the reaction. As the reaction progresses, the colour changes from dirty yellow or red (depending on the colour of the starting material); it deepens and ultimately becomes almost black. Any temperature between 130.degree. C. and 150.degree. C. can be used for the reaction; however, a temperature of 135.degree. C. gives the optimum results. Temperature of the liquid is initially at around 100.degree. C. but rises with polymerization and reaches 135.degree. C. at the optimum polymerization level.

Initially, dihydrogen phosphates of zinc, iron, manganese and magnesium are formed. With further absorption of heat, polymerisation of the phosphates occurs with formation of zinc iron manganese magnesium polyphosphate. The reaction can be followed by observing the changes in colour, density and viscosity of the liquid. At the end of the reaction period, the liquid is deep brown in colour. Density (reaches 2 g/cc at end-point) and viscosity (reaches 101-130 centipoise at the end-point) are also useful to obtain the end-point of reaction. The polyphosphate is a flowable liquid when hot but when cooled to room temperature, it becomes a thick, highly viscous material After the end-point of reaction, if heating is further continued, the liquid becomes highly viscous and hair-like strands are formed, which solidify on cooling.

Testing of the product is done by taking a small portion, neutralising with ammonia to pH 5.0-7.5. Optimum pH for neutralisation is pH 5.6-6.5. The product is tested for its solubility in 0.33M citric acid and 0.005M DTPA (diethylene triamine penta acetic acid). The product of desired degree of polymerisation is almost completely soluble in these reagents within 60 min. Higher polymerised product will leave an insoluble residue and is not a desirable material. Lower polymerised products may contain unreacted black particles (pyrolusite). The polyphosphate at the desired level of polymerisation is a flowable liquid. It is poured into a container, allowed to cool to room temperature and subsequently neutralised with a basic material. Ammonia solution is preferred because time requirement for neutralisation reaction is faster compared to solid bases like magnesia, magnesium carbonate, lime, etc. However, any such basic material may be used. Optimum pH for neutralisation is 5.5-6.5. If too little base is added, the finished product will tend to become hygroscopic. Solubility in citrate and DTPA solutions will also be lower. Addition of too much of base offers no particular advantage and will also make the product more insoluble in citrate and DTPA solutions. After neutralisation, the dark blackish product changes colour to a light grey material. This is dried at temperatures <100.degree. C., preferably at 60-80.degree. C. It is then ground and sieved to sizes between 50-300 mesh but preferably through 150 mesh BS. The product is powdery and non-hygroscopic. It is practically insoluble in water (<1%) but is highly soluble in 0.33 M citric acid or 0.005 M DTPA. It is to be applied by broadcasting on the soil before the final tillage or placed as a band around the root zone of standing crops.

Iron-Manganese-Copper Fertilizer

The process for production of iron-manganese-copper fertilizer is similar to that for zinc-iron-manganese fertilizer. Starting materials are the same as described above except that cupric oxide or cupric sulphate or chloride is used instead of zinc ash or zinc oxide.

The ratios of Fe:Cu are fixed keeping in view the lower crop requirements of copper compared to iron. Ratios of Fe:Cu ranging from 1 0.1 to 1:1 may be taken with suitable adjustments of phosphoric acid addition. Proportions of Mn may be varied over the range Fe:Mn=1:0.1 to 1:10. Weight ratios of Fe:Mg may also be varied from 1:0.01 to 1:10. An optimum and desirable ratio of reactants is Fe:Mn:Cu:Mg=1: 0.5:0.25:0.5. Higher amounts of Mg increase the viscosity of the polyphosphate; the product becomes too viscous to be poured out of the vessel. Lower amounts would leave some unreacted particles. Mg may be partially or completely replaced by Ca. weight ratios may, therefore, vary from Fe:Ca=1:0.16 to 1:16. Amount of P in the reaction mixture should be sufficient to convert all the cations to the dihydrogen phosphates. Excess phosphate must be added to compensate for phosphate consumption by impurities. Thus, the P requirement weight ratios may range from Fe:Mn:Cu:Mg: P=1:0.5:0.25:0.5:9 (when impurities are high) to 1:0.5:0.25: 0.5:3.5 (when impurities are low). Reactants are taken together in a acid proof brick-lined furnace and heated at temperatures of 130.degree. C. to 150.degree. C. Higher temperatures can also be used but 135.degree. C. has been found to be best suited since react ion controls are easier and there is less chance of over-polymerisation. The remaining procedure is as described above. Another way is to pre-heat copper oxide and phosphoric acid at temperatures from 50-100.degree. C. till it is partially dissolved, then add the remaining ingredients and continue the reaction at 135.degree. C.

Pre-heating ensures better solubilisation of cupric oxide; however, addition of magnesia is a problematic step since the acid is hot and reaction is very vigorous and sometimes violent Therefore, care must be exercised.

The neutralized material is dried at temperatures around 60-80.degree. C., ground and sieved through 150 mesh BS. The fertilizer is practically insoluble in water (<1%) but is highly soluble in 0.33 M citric acid or 0.005 M DTPA. This product is also powdery and non-hygroscopic and should be applied by broadcasting on the soil before the final tillage or placed as a band around the root zone of standing crops.

Zinc-Iron-Manganese-Copper Fertilizer

Another fertilizer that may be produced by the same principles is the multinutrient zinc-iron-manganese-copper fertilizer. The weight ratios of Zn:Fe may vary from 20:1 to 1:20; weight ratios of Fe:Mn may vary from 1:1.0 to 1:0.1 and Fe:Mg may vary from 1:0.01 to 1:10. Ratios of Fe:Cu ranging from 1:0.1 to 1:1 may be taken. Optimum ratios would vary according to soil and crop conditions but generally most suitable weight ratios would range from Zn:Fe:Mn:Mg=3:1: 0.5:0.25:0.125 to 1:1:0.5:0.25:0.125. The phosphoric acid added must be sufficient to convert all cations to the dihydrogen phosphates. Impurities also consume phosphoric acid and hence excess acid is required depending on the impurity level. Thus, the weight ratio of P may very as Zn:Fe:Mn:Cu: Mg:P=3:1:0.5:0.25:0.125:10 to 3:1:0.5:0.25:0.125:5.

Required quantity of phosphoric acid is taken in the reactor vessel, zinc ash is added to it and the system heated. Reaction would also occur but slowly in the absence of heating so it is desirable to give heat to speed up the process. Generally a temperature of 70-100.degree. C. is best suited. After about 15-30 min, rest of the ingredients are added and reaction carried out as described for the zinc-iron-manganese system. Product characteristics are as described earlier.

Reaction Principles:

The principle underlying the production of these bio-release fertilizers according to the process of the present invention is that when zinc oxide (zinc ash), iron oxide, pyrolusite copper salt and magnesia are heated with phosphoric acid, the dihydrogen phosphates, viz., $Zn(H_2PO_4)_2$, $Fe(H_2PO_4)_3$, $Mn(H_2PO_4)_4$, $Cu(H_2PO_4)_2$ and $Mg(H_2PO_4)_2$ are formed and water is eliminated. For the reaction to proceed towards the formation of dihydrogen phosphates, the water formed during reaction must be removed by heating or vacuum. Magnesia reacts most readily with the acid followed by zinc ash. Hematite and pyrolusite are much more resistant to dissolution in phosphoric acid. However, in the presence of $Mg^{2+}$, solubilisation of hematite and pyrolusite occurs more rapidly and completely. The polyphosphate also has a larger range of optimum solubility and thereby controlling the reaction is easier.

Alternatively, this polymerization process may also be carried out by replacing the magnesium component with equivalent amounts of the hydroxides or carbonates of calcium. Use of equivalent amounts of calcium carbonate and magnesium carbonate corresponding to dolomite compositions) yields fairly similar product characteristics.

Polymerisation occurs by the formation of —P—O—P— linkages between adjacent phosphate groups. A linear chain is, thus, formed with $Zn^{2+}$, $Fe^{3+}$, $Mn^{4+}$ and $Mg^{2+}$ being linked to the remaining O atoms on the P. Ions like $Fe^{3+}$ having multiple charges can cause extensive cross-linking of chains leading to a 3-D structure from which the $Fe^{3+}$ or $Mn^{4+}$ cannot be extracted even by organic chelates. Addition of $Mg^{2+}$ improves the solubility characteristics by weakening the strength of the cross linkages and making the compound more soluble in chelates.

Polymerisation must be stopped before the product becomes much too insoluble in chelates, since this would reduce availability of the nutrients to plants. Polymerisation is stopped when the phosphate is only partly polymerised and the products have good solubility in organic chelates like citrate or DTPA. The partly polymerised polyphosphate contains acidic P—OH groups; moreover, it is in a semi-liquid form. To convert the compound to a dry solid, the acidic P—OH groups have to be neutralised. Neutralisation also reduces the water solubility of the compound. Ammonia is a good neutralising agent; other bases like lime, magnesia, sodium or potassium hydroxide or carbonates can also be used. The preferred neutralizing agent is ammonia in view of its ease of neutralization and better quality of product.

This invention-provides a substantial improvement over previous processes for the production of bio-release fertilizers. Here, multinutrient compounds are produced in a single process thereby saving energy and labour required to produce individual fertilizers and then mixing them. Moreover, individual processes for zinc and copper fertilizers require higher reaction temperatures (around 300.degree. C.). The process is greatly simplified and the polyphosphate remains in a liquid state, which makes material handling and equipment, design easier. Process control is also simplified since density and viscosity of the liquid can be continuously monitored and thereby the end-point of reaction can be readily detected. Lastly, the process is simpler and requires less energy inputs than all previous processes.

Accordingly, this invention provides, a process for the production of multinutrient bio-release fertilizer of zinc-iron-manganese, iron-manganese-copper and zinc-iron-manganese-copper. All existing slow-releasing fertilizers of the micronutrients have nutrient release controlled by hydrolysis or diffusion mechanism. The new bio-release forms have a superior nutrient supply mechanism, which is similar to that from the soil nutrient storehouse. In these fertilizers, the nutrients are present in water insoluble but at the same time in a plant available form that is readily dissolved by not exudate organic acids. The fertilizers are also non-toxic, non-hygroscopic, environment friendly, easy to apply and exhibit improved fertilizer use-efficiency.

The invention will now be explained in greater detail with the help of the following non-limiting examples.

Example 1

Orthophosphoric acid containing 58.5% $P_2O_5$ is taken in a glass beaker. To 67.5 g of the acid, 2.42 g of zinc ash (containing 76.8% Zn) is added and stirred. Evolution of gas is observed. The beaker is placed in an oven at 100.degree. C. for 15 min. Then 8 g of hematite (containing 46.3% Fe), 3.76 g pyrolusite (containing 49.3% Mn) and 1.11 g magnesia (containing 41.7% Mg) are added and stirred. The colour of the mixture at this stage is dirty deep maroon. The beaker is again placed in the furnace at a temperature of 135.degree. C. Much frothing occurs as the polymerisation proceeds. Liquid temperature increases and reaches 135.degree. C. At this stage, the beaker is taken out of the furnace. The colour of the liquid is almost black. A portion is neutralised with ammonia to pH 5.6 and tested for its solubility in 0.33M citric acid. The desired product gives an almost clear solution within 60 min. Materials, which are much top polymerised or too little polymerized, leave a residue.

The polyphosphate is allowed to cool to room temperature whereupon it thickens. Then 130 g ammonia solution (25% $NH_3$) is added with mixing. The pH of the product is, thus, raised to about 5.6. Its colour changes to very light grey. It is then dried in an oven at 80.degree. C., ground in a mortar and sieved with 150 mesh BS sieve.

Example 2

10 kg of commercial orthophosphoric acid containing 58.5% $P_2O_5$ is taken in an acid-proof brick lined reactor vessel with a stirrer. Zinc ash (0.36 kg containing 76.8% Zn) is added, the mixture is stirred with a stirrer and heated to 80.degree. C. for 20 min. Then 1.19 kg hematite (containing 46.3% Fe), 0.56 kg pyrolusite (containing 49.3% Mn), and 0.165 kg roasted magnesite (containing 41.7% Mg) are added. The suspension is stirred and hearing is started with the temperature at 140.degree. C. For this quantity of reactants, 200 min heating is required at 140.degree. C. The liquid is poured out into a stirrer. It is allowed to cool to nearly room temperature then 10 liter ammonia solution (25% ammonia) is slowly added with continuous stirring. A sample is taken and tested for its pH, which should be around 5.6-6.0. The suspension is poured out into trays and dried in an oven at 80.degree. C. It is finally ground through 100 mesh BS. About 13 kg of fertilizer is obtained.

The fertilizer is tested to be almost completely soluble in 0.33M citric acid and 0.005M DTPA. Both products obtained by examples 1 & 2 contain Zn:Fe:Mn:Mg in the ratio 1:2:1: 0.25 and has the following content of nutrients, Zn=2.3%, Fe=4.6%, Mn=22%, Mg=0.54%, N=14% and P=22%. The solubility of the cations in 0.33 M citric acid is >90% and in 0.005 M DTPA it is >85%.

Example 3

The procedure is essentially the same as in example 1 except that 8 g goethite (containing 62% Fe) is used instead of hematite. 115.6 g orthophosphoric acid is taken and 19.38 g zinc ash is added followed by 8 g goethite, 3.93 g manganese dioxide (containing 63% Mn) and 3 g magnesium carbonate (containing 20.5% Mg). The reactants are taken in a borosilicate glass beaker, stirred and kept in a muffle furnace set at 200.degree. C. After 35 min when the liquid temperature reaches 134.degree. C., the beaker is removed from the furnace. The sample is neutralised with magnesium oxide up to a pH of 6.0 and its solubility in 0.33 M citric acid is tested. It is almost completely soluble. A light grey product is formed which is dried at 70.degree. C. in an oven. The dried material is powdered and sieved through 150 mesh BS.

Example 4

The process for producing a iron-manganese-copper fertilizer is described in this example. This procedure is similar to that described in example 0.2 except that no zinc ash is used. Here, 10 kg of commercial orthophosphoric acid containing 58.5% P.sub.2O.sub.5 is taken, in an acid-proof brick lined reactor vessel with a stirrer. Then 0.95 kg hematite (containing 46.3% Fe), 0.45 kg pyrolusite (containing 49.3% Mn)), 0.5 kg cupric sulphate (containing 22.2% Cu) and 0.53 kg roasted magnesite (containing 41.7% Mg) are added. The suspension is stirred and heating is started with/the external air temperature set at 200.degree. C. As the liquid temperature reaches 135.degree. C., the reaction is stopped. For these quantities of reactants, about 230 min heating is required. The liquid is poured out into a stirrer vessel while still hot It is allowed to cool to nearly room temperature, then 10 liter ammonia solution (25% ammonia) is added with continuous stirring. A sample is taken and tested for its pH, which should be around 5.6-6.0. The suspension is poured out into trays and dried in an oven at 80.degree. C. It is finally ground to a 80 mesh BS size. About 13 kg fertilizer is obtained. The product contains Fe:Mn:Cu in the weight ratio 1:0.5:0.25 and has the following composition: Fe=3.3%, Mn=1.6%, Cu=0.8%, Mg=1.5%, N=14.5% and P=19%. Water solubility of the cations is <2%. Solubility in 0.33 M citric acid is >90% for Fe, Mn and Cu. Solubility in 0.005 M DTPA is >85% for all cations.

Example 5

Copper-iron-manganese fertilizer may also be produced with cupric oxide instead of cupric sulphate. The process is essentially the same as in example 4 except that 170 g cupric oxide (containing 65% Cu) is used. Testing for solubility and neutralisation are done as described in example 1.

Example 6

For the production of a zinc-iron-manganese-copper fertilizer, 10 kg of commercial orthophosphoric acid containing 58.5% P.sub.2O.sub.5 is taken in an acid-proof brick lined reactor vessel with a stirrer. Zinc ash (1.25 kg containing 76.8% Zn) is added to the mixture, stirred with a stirrer and heated to 70.degree. C. for around 30 min. Then 0.69 kg hematite (containing 46.3% Fe), 0.324 kg pyrolusite (containing 49.3% Mn), 0.313 kg cupric sulphate (containing 22.2% Cu) and 0.096 kg roasted magnesite (containing 41.7% Mg) are added. The suspension is stirred and heating is started. Temperature of the liquid which is about 80.degree. C. at this stage, increases gradually to 135.degree. C. Heating is then stopped and the liquid is poured out into a stirrer vessel. For these quantities of reactants, about 230 min heating is required. It is allowed to cool to nearly room temperature, then 9.5 liter ammonia solution (25% ammonia) is added with continuous stirring. A sample is taken and tested for its pH, which should be around 5.6-6.0. The suspension is poured out into trays and dried in an oven at 80.degree. C. It is finally ground to a 150 mesh BS size. About 12 kg fertilizer is obtained.

The polyphosphate is tested for solubility in citric acid and neutralised as described in example 1. The weight ratio of Zn:Fe:Mn:Cu in this product is 3:1:0.5:0.25. Composition of the product is as follows: Zn=7.9%, Fe=2.6%, Mn=1.3%, Cu=0.6%, Mg=0.3%, N=13.5% and P=20.6%. Solubility of the product in water is <1% for Zn, Fe and Mn and 1.8% for Cu. In 0.33 M citric acid, the cations Zn, Fe, Mn and Cu have solubility >90% and in 0.005M DTPA, it is >90% for Fe and Cu and >80% for Mn and Zn.

Field tests with rice showed that even at the lowest dose of 1 kg/ha Zn, 0.33 kg/ha Fe, 0.17 kg/ha Mn, 0.08 kg/ha Cu, the bio-release fertilizers have significantly higher grain yields, which is 43% higher than the control, (grain yield increase of 1405 kg/ha). Field trials with potato showed highest yield increases of 62% over the control at a dose of 4 kg/ha Zn, 1.33 kg/ha Fe, 0.67 kg/ha Mn, 0.33 kg/ha Cu. This corresponds to a yield increase of 6125 kg/ha of tuber.

Example 7

This is essentially the same as example 6 except that at the neutralisation stage, 7 kg lime (containing 35.7% Ca) is used, instead of ammonia.

Example 8

The process is essentially the same as in example 6 except that proportionally less zinc ash and more hematite is used. Here, 10 kg of commercial orthophosphoric acid containing 58.5% P.sub.2O.sub.5 is taken in an acid-proof brick lined reactor vessel with a stirrer. Zinc ash (0.6 kg containing 76.8% Zn) is added to the mixture, stirred with a stirrer and heated to 90.degree. C. for around 15 min. Then 0.995 kg hematite (containing 46.3% Fe), 0.467 kg pyrolusite (containing 49.3% Mn), 0.452 kg cupric sulphate (containing 22.2% Cu) and 0.138 kg roasted magnesite (containing 41.7% Mg) are added. The remaining process is the same as described in example 6. About 14 kg product is obtained. It has nutrients in the weight ratio Zn:Fe:Mn:Cu=1:1:0.5:0.25. Composition of the product is as follows: Zn=3.2%, Fe=3.2%, Mn=1.5%, Cu=0.8%, Mg=0.4%, N=12% and P=17.5%. Solubility of the product in water is <1% for Zn, Fe, Mn and Cu. In 0.33 M citric, acid and 0.005 M, the cations Zn, Fe, Mn and Cu have solubility between 80-90%.

Example 9

This is essentially the same as example 6 except that at the neutralisation stage, 5.1 kg sodium hydroxide (containing 57.5% Na) is used, instead of ammonia.

Example 10

This is also essentially the same as example 6 except that at the neutralisation stage, 7.1 kg potassium hydroxide (containing 69.6% K) is used, instead of ammonia.

I claim:

1. A process for the preparation of water insoluble bio-release micronutrient fertilizers, containing iron and manganese with zinc and/or copper, comprising:

heating orthophosphoric acid at a temperature of 130° C.-150° C. with a mixture of iron oxide, manganese dioxide or pyrolusite, compounds comprising zinc and/or compounds comprising copper, and a basic compound to produce a multi-metallic liquid polyphosphate;

neutralizing the polyphosphate with the basic compound to form a neutralized polyphosphate; and drying and pulverizing the neutralized polyphosphate to obtain a solid powdery material.

2. The process of claim 1, wherein the compounds comprising zinc and/or compounds comprising copper are selected from the group consisting of zinc ash, zinc oxide, cupric oxide, cupric sulphate, and cupric chloride.

3. The process of claim 1, wherein the basic compound is an oxide or carbonate of magnesium or calcium.

4. The process of claim 1, wherein the iron oxide is the oxide or oxyhydroxide such as hematite (red oxide) or goethite (yellow oxide).

5. The process of claim 1, wherein the weight ratio of Zn:Fe is from 20:1 to 1:20.

6. The process of claim 1, wherein the weight ratio of Fe:Mn is from 1:0.1 to 1:10.

7. The process of claim 1, wherein the weight ratio of Fe:Cu is from 1:01 to 1:1.

8. The process of claim 1, wherein the weight ratio of Fe:Mg is from 1:0.01 to 1:10.

9. The process of claim 1, wherein the weight ratio of Fe:Ca is from 1:16 to 1:0.16.

10. The process of claim 1, wherein the orthophosphoric acid comprises up to 50% $P_2O_5$ by weight.

11. The process of claim 1, wherein the amount of phosphoric acid is equal to or greater than that required to convert all the cations in the reaction mixture to dihydrogen phosphates.

12. The process of claim 2, wherein the zinc ash is preheated with phosphoric acid.

13. The process of claim 2, wherein the zinc ash is preheated with phosphoric acid at a temperature between 25° C.-100° C.

14. The process of claim 2, wherein zinc oxide is added to the phosphoric acid and heated at polymerization temperatures.

15. The process of claim 2, wherein the cupric oxide is preheated with phosphoric acid at a temperature between 50° C.-100° C.

16. The process of claim 2, wherein the cupric oxide or sulphate is added to the phosphoric acid and heated at polymerization temperatures.

17. The process of claim 1, further comprising the step of heating to the extent that polyphosphate is produced.

18. The process of claim 1, wherein the neutralized polyphosphate is soluble in 0.33M citric acid and/or 0.005M DTPA.

19. The process of claim 1, wherein excess water formed during the reaction is removed by heating or vacuum.

20. The process of claim 1, wherein the polyphosphate is cooled to room temperature before the step of neutralizing.

21. The process of claim 1, wherein the polyphosphate is neutralized with a basic compound to a pH of from 5.0 to 7.5.

22. The process of claim 1, wherein the basic compound is selected from the group consisting of oxides, hydroxides or carbonates of magnesium, calcium, sodium or potassium, and ammonia.

23. The process of claim 1, wherein the neutralized polyphosphate is dried at a temperature not exceeding 100° C.

24. The process of claim 1, wherein the solid material is pulverized to a size smaller than or equal to 150 mesh.

25. A solid, powdery, water-insoluble, slow-releasing fertilizer comprising: zinc-iron-manganese polyphosphate, iron-manganese-copper polyphosphate and zinc-iron-manganese-copper polyphosphate together with one or more bases of magnesium, calcium or ammonium, wherein the polyphosphate is only partially polymerized.

26. The water-insoluble fertilizer of claim 25, wherein the fertilizer is more than 85% soluble in citrate and/or DTPA solutions.

* * * * *